(12) United States Patent
Lavi et al.

(10) Patent No.: US 8,918,232 B2
(45) Date of Patent: Dec. 23, 2014

(54) SHORT RANGE WIRELESS COMMUNICATION BETWEEN A VEHICLE AND A HANDHELD COMMUNICATIONS DEVICE

(71) Applicant: General Motors LLC, Detriot, MI (US)

(72) Inventors: Nadav Lavi, Ramat-Hasharon (IL); Andrew J. Macdonald, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/739,111

(22) Filed: Jan. 11, 2013

(65) Prior Publication Data
US 2014/0200740 A1 Jul. 17, 2014

(51) Int. Cl.
G06F 17/00 (2006.01)
G06F 21/00 (2013.01)

(52) U.S. Cl.
CPC ................ G06F 17/00 (2013.01); G06F 21/00 (2013.01)
USPC .............................................. 701/2; 455/421

(58) Field of Classification Search
CPC .... G06F 17/00; G06F 21/00; H04M 2250/02; H04M 2203/2094; H04M 3/42263; H04M 2242/30; H04W 52/045; H04W 84/042; H04W 4/16; H04W 88/06; H04W 76/02; H04W 76/021; H04W 76/025; H04W 76/028; H04B 17/0057; H04B 17/004; H04L 63/0892; H04L 64/104
USPC ........ 701/2, 1, 36, 468; 455/421, 3.01, 556.1, 455/556.2; 726/6, 7; 713/151, 152; 307/338
See application file for complete search history.

(56) References Cited

U.S. PATENT DOCUMENTS

| | | | |
|---|---|---|---|
| 2005/0086542 A1* | 4/2005 | Nakazawa et al. | 713/202 |
| 2005/0195781 A1* | 9/2005 | Ikeda | 370/338 |
| 2008/0200166 A1* | 8/2008 | McCamon | 455/426.1 |
| 2009/0177481 A1* | 7/2009 | Curtin | 705/1 |
| 2010/0124213 A1* | 5/2010 | Ise et al. | 370/338 |
| 2011/0292864 A1* | 12/2011 | Sasao et al. | 370/315 |
| 2013/0044595 A1* | 2/2013 | Han et al. | 370/230 |
| 2013/0304281 A1* | 11/2013 | Burcham et al. | 701/2 |

* cited by examiner

*Primary Examiner* — Marthe Marc-Coleman
(74) *Attorney, Agent, or Firm* — Anthony Luke Simon; Reising Ethington P.C.

(57) ABSTRACT

A method and system for establishing short range wireless communication (SRWC) between a handheld communications device (HCD) and a vehicle telematics unit. In some instances, the communication may be established following a disconnection event between the telematics unit and a wireless carrier network. The SRWC may include Bluetooth and Wi-Fi Direct as well as other suitable protocols or technologies. Once SRWC is established, the telematics unit may receive a vehicle command from the HCD and perform the command.

6 Claims, 4 Drawing Sheets

SHORT RANGE WIRELESS COMMUNICATION BETWEEN A VEHICLE AND A HANDHELD COMMUNICATIONS DEVICE

TECHNICAL FIELD

The present invention relates generally to short-range wireless communications, and more particularly to short-range wireless communications between vehicles and handheld communications devices.

BACKGROUND OF THE INVENTION

Vehicles may include telematics systems that may have the capability of communicating using short-range wireless communication such as Bluetooth. In addition, some modern cellular telephones include features and software applications beyond mere telephony such as the ability to utilize short-range wireless communication.

SUMMARY OF THE INVENTION

According to an aspect of the invention, there is provided a method of establishing short range wireless communication (SRWC) between a handheld communications device (HCD) and a vehicle telematics unit. The method may include a step of linking a vehicle telematics unit to a HCD prior to a disconnection event between the telematics unit and a wireless carrier system; a step of determining the occurrence of the disconnection event; and a step of establishing SRWC between the telematics unit and the HCD as a result of the disconnection event to enable the HCD to command the telematics unit to perform at least one vehicle function.

In accordance with another aspect of the invention, there is provided a method of performing a vehicle function using a HCD. The method may include the steps of: experiencing at a vehicle telematics unit a disconnection event from a wireless carrier system; establishing short range wireless communication (SRWC) between the telematics unit and a handheld communication device (HCD); receiving a command at the telematics unit from the HCD to perform at least one vehicle function via the SRWC; and performing at least one the vehicle function based on the command. The telematics unit and HCD may be linked to one another prior to the disconnection event.

In accordance with another aspect of the invention, there is provided a method of performing a vehicle function using a HCD. The method may include a steps of linking a HCD to a vehicle telematics unit prior to a disconnection event between the telematics unit and a wireless carrier system; a step of automatically establishing a short range wireless communication (SRWC) between the telematics unit and the HCD as a result of the disconnection event; and a step of sending at least one vehicle function command to the telematics unit from the HCD via SRWC.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to vehicles equipped with modular or embedded wireless telephony for communication over a wireless carrier system, as well as a variety of sensors which can detect whether the vehicle door is open or ajar, whether the vehicle door is locked, whether the vehicle engine is running, etc. Modern handheld communication devices (HCDs), such as Smart phones and other mobile devices, may also wirelessly communicate via the same wireless carrier system. Thus, an instruction may be sent using the HCD via the wireless carrier system to the vehicle instructing the vehicle to perform some vehicle function such as unlocking the door or starting the engine. In some situations, this is not possible because of a connectivity lapse (e.g., the loss or absence of a cellular signal or disconnection from a cellular paging channel). However, in addition to wireless telephony capability, both vehicle telematics equipment and HCDs may have the capability to communicate via short-range wireless communication, such as Wi-Fi Direct and Bluetooth. Thus, in certain circumstances, it may be advantageous to send an instruction from the HCD to the vehicle telephony equipment over a short-range wireless network. Such instructions may include lock/unlock, vehicle start, vehicle horn activation, etc. In some instances, it may be desirable for the vehicle and/or the HCD to identify the disconnection and establish communication without user interaction (e.g., automatically).

Communications System—

Figure 1:
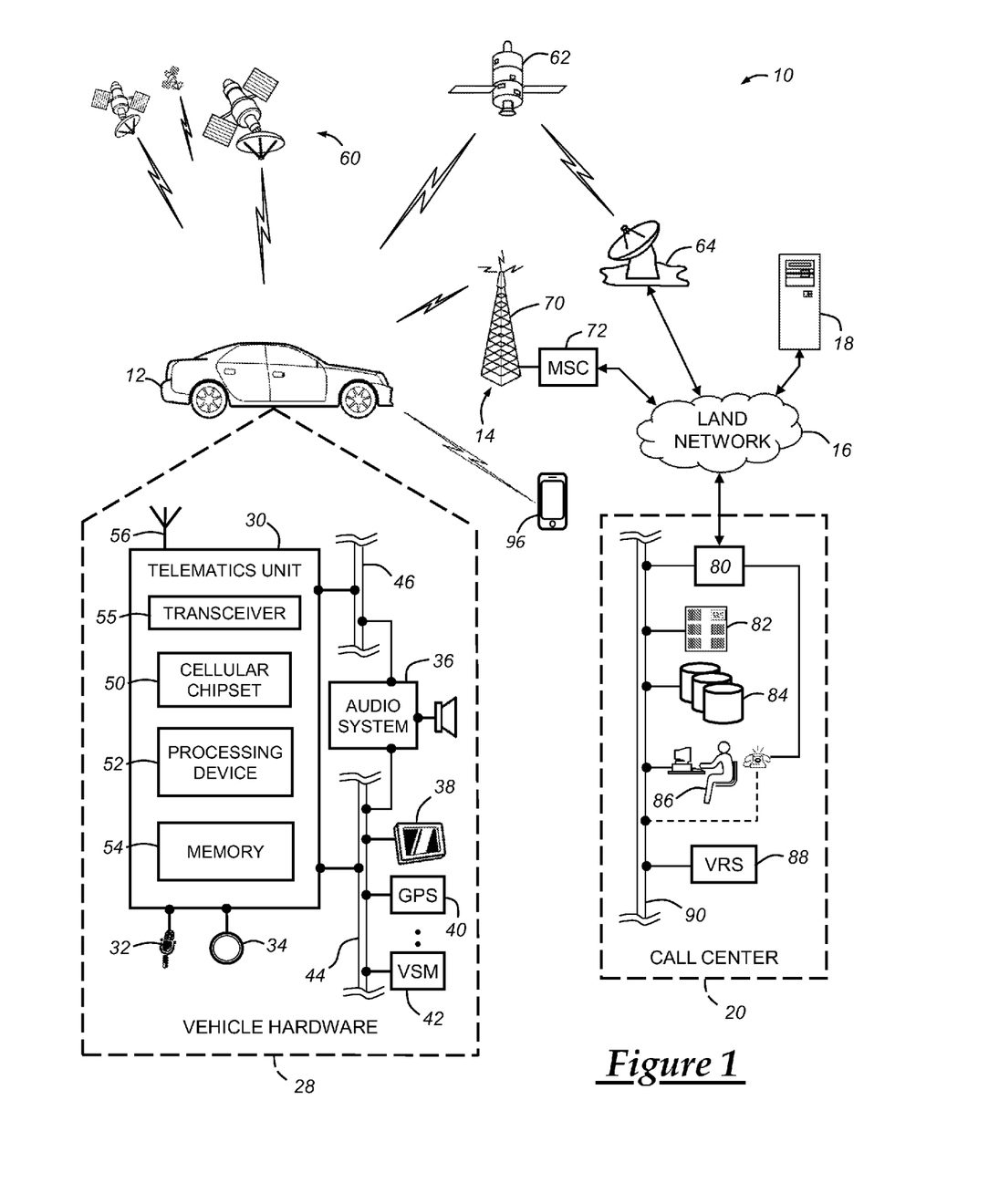
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit may have a radio transceiver 55 and may preferably use radio transmissions to establish a communications channel (a voice channel and/or a data channel) with wireless carrier system 14 so that voice and/or data transmissions can be sent and received over the channel. In addition, the transceiver 55 may be used for short range wireless communication as well, as will be described below in greater detail. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a handheld communications device (HCD) 96) can also be carried out using telematics unit 30. For this purpose, telematics unit 30 can be configured to communicate wirelessly according to one or more suitable wireless protocols (e.g., WiMAX, ZigBee.rtm., etc.), including any short range wireless communication (SRWC) such as any suitable Wi-Fi standard (e.g., IEEE 802.11), WiFi-Direct, Bluetooth, wireless infrared transmission, or various combinations thereof. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system, subsystem diagnostic tests, and perform other suitable vehicle functions. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks, the vehicle's horn, the vehicle's headlamps, and the vehicle's ignition or engine-start up. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle electronics 28 may also include a control system for monitoring and/or regulating an electrical power budget which may include instances where the vehicle engine is ON or OFF. For example, skilled artisans will appreciate that in some instances various vehicle electronics may draw a small current (e.g., a trickle current) when the vehicle engine OFF. In one embodiment, the power budget of the vehicle in the OFF-state may not be greater than some predetermined number of Amp-hours for any first period of time (e.g., a number of sequential days) (e.g., to ensure enough power remains to operate the vehicle ignition when the vehicle is restarted). In addition, the power budget may require that the telematics unit 30 be operable in the OFF-state for a second period of time (which shorter than the first period). When this budget is expended, all noncritical electrical vehicle systems may shut down in order to conserve power.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The HCD 96 may be an electronic device which may be used to make mobile telephone calls across a wide geographic area where transmissions are facilitated by the wireless carrier system 14 (also shown in FIG. 1) (i.e., when the HCD is connected to the wireless carrier system). The HCD may include: hardware, software, and/or firmware enabling cellular telecommunications and communications via short-range wireless communication (e.g., WiFi Direct and Bluetooth) as well as other HCD applications. Such HCD applications may include software applications, which may be preinstalled or installed by the user and/or via a graphical user interface (GUI). The hardware of the HCD 96 may comprise: a display, a keypad (e.g., push button and/or touch screen), a microphone, one or more speakers, motion-detection sensors (such as accelerometers, gyroscopes, etc.), and a camera. In addition to the aforementioned features, modern HCDs may support additional services and/or functionality such as short messaging service (SMS or texts), multimedia messaging service (MMS), email, internet access, as well as business and gaming applications. Non-limiting examples of the HCD 96 include a cellular telephone, a personal digital assistant (PDA), a Smart Phone, a personal laptop computer having two-way communication capabilities, a netbook computer, or combinations thereof. The HCD 96 may be used inside or outside of a mobile vehicle (such as the vehicle 12 shown in FIG. 1), and may be configured to provide services according to a subscription agreement with a third-party facility.

The HCD 96 and the vehicle 12 may be used together by a person known as the vehicle user. The vehicle user does not need to be the driver of the vehicle 12 nor does the vehicle user need to have ownership of the HCD 96 or the vehicle 12 (e.g., the vehicle user may be an owner or a licensee of either or both).

Method—

As previously stated, the telematics unit 30 and the HCD 96 may be used for short-range wireless communication (SRWC). In certain circumstances, it may be desirable for the HCD and the telematics unit 30 to communicate with one another via SRWC. Two known short-range wireless communication protocols include Bluetooth and Wi-Fi Direct. The establishment of communication or a communication channel via these protocols may differ.

Bluetooth Linking (Pairing and Bonding)

When using a Bluetooth protocol, the HCD and telematics unit may pair one with another (or link to one another) when within a wireless range (e.g., prior to experiencing a disconnection from the wireless network). In order to pair, Bluetooth devices such as the telematics unit and HCD may act in a BEACON or DISCOVERABLE MODE having a general identification (ID); Bluetooth pairing is known to skilled artisans. The general identifier (ID) may include, e.g., the device's name, class, available services, and other suitable technical information. The telematics unit and HCD may also pair via a non-beacon mode. In these instances, the call center 20 may participate in pairing the HCD and telematics unit. For example, the call center 20 may initiate the inquiry procedure between the telematics unit 30 and the HCD 96. And the call center may identify the HCD as belonging to the user of the vehicle and then receive from the HCD its general ID and authorize the telematics unit via the wireless communication system 14 to pair with this particular ID. In at least one embodiment, the telematics unit 30 may only pair with other network devices (such as an HCD) with such authorization.

And in another embodiment, the telematics unit 30 may also have a special identifier (ID) in addition (or instead of) the general ID to provide greater communication security; here, the telematics unit may operate in a STEALTH MODE. The special ID may be provided and/or programmed, for example, via the call center 20 or at a vehicle service center or during manufacture prior to any pairing event. The special ID may include, e.g., numbers, letters, special characters, or combination thereof (such as an alpha-numeric sequence); in one embodiment, it may be an identifier of the telematics unit, such as a serial number (SN); in another embodiment, it may be randomly generated (e.g., at the telematics unit, call center, service center, etc.). According to one implementation, the special ID may only be used during pairing procedures initiated by the call center and may only be used for this purpose (i.e., pairing an HCD associated with both the vehicle user and the telematics unit).

Other embodiments may include instances where the call center does not participate in pairing the Bluetooth devices—where the vehicle telematics unit and the HCD are preprogrammed or preconfigured to recognize and identify each other; e.g., the special ID is known by the HCD—in at least one embodiment, the HCD is provided with the telematics unit's special ID from the call center (e.g, because the vehicle user is authorized to pair the telematics unit and HCD together).

Once pairing is complete, the devices may be bonded as will be appreciated by skilled artisans—i.e., they may recognize one another and/or connect automatically when they are in a predetermined proximity or range of one other (i.e., they may become, at least temporarily, network participants). Typically, as will be appreciated by skilled artisans, in some instances, one device may act as a paging device and the other device may act as a listening device; i.e., one device may operate in a PAGING MODE while the other device may operate in a LISTENING MODE (e.g., the device in the LISTENING MODE may listen according to Bluetooth protocol periodically, for example, once every 1.28 seconds or 2.56 seconds). In one embodiment, the telematics unit 30 is configured to be the listening device and operate in the LISTENING MODE.

Wifi-Direct Linking (Pairing and Bonding)

Now turning to the Wi-Fi Direct protocol, skilled artisans will appreciate that within the Wi-Fi Direct protocol, there may be a group having group members (or network participants which are linked to one another). The group members may include a group owner (i.e., a device which acts as a host) and one or more various satellite devices (which act as clients). Where the telematics unit uses Wi-Fi Direct, the unit 30 may be preconfigured (e.g., by a vehicle service center or at the time of manufacture) to be the group owner. The HCD 96 may be a satellite device. And thus, the HCD 96 may be required to register or link with the group prior to implementing any communication via Wi-Fi Direct (e.g., prior to experiencing a disconnection from the wireless network).

As will be appreciated by skilled artisans, registration in the Wi-Fi Direct protocol may occur in various ways—at least one way may be more secure than others. For example, the telematics unit 30 may operate in a BEACON MODE and broadcast its identity making itself known to other Wi-Fi Direct devices (e.g., periodically broadcasting). However, the telematics unit 30 also may operate in a STEALTH MODE; i.e., a more secure form of registration that may include an instance where the HCD 96 knows the special identifier (ID) of the telematics unit 30, and the telematics unit 30 does not broadcast its identity at all but rather waits in a LISTENING MODE for request from a satellite device such as the HCD 96. As in the previous explained implementation, the special ID may be generated or acquired by any similar means (e.g., a telematics unit identifier or a randomly generated identifier; and it likewise may be received from a call center, service center, manufacturer, etc.) Therefore, when the telematics unit receives the request from the HCD 96 (having the special ID) to register with the group to which the telematics unit is the host, it may respond establishing a peer-to-peer session. Other registration embodiments are also possible—e.g., the HCD may be the host or group owner and the telematics unit may be a participant or client; the HCD may act in a BEACON or STEALTH MODE; further the call center may or may not facilitate the registration. And similar to Bluetooth, once members have registered with the group owner, they may be bonded to the group.

Figure 2:
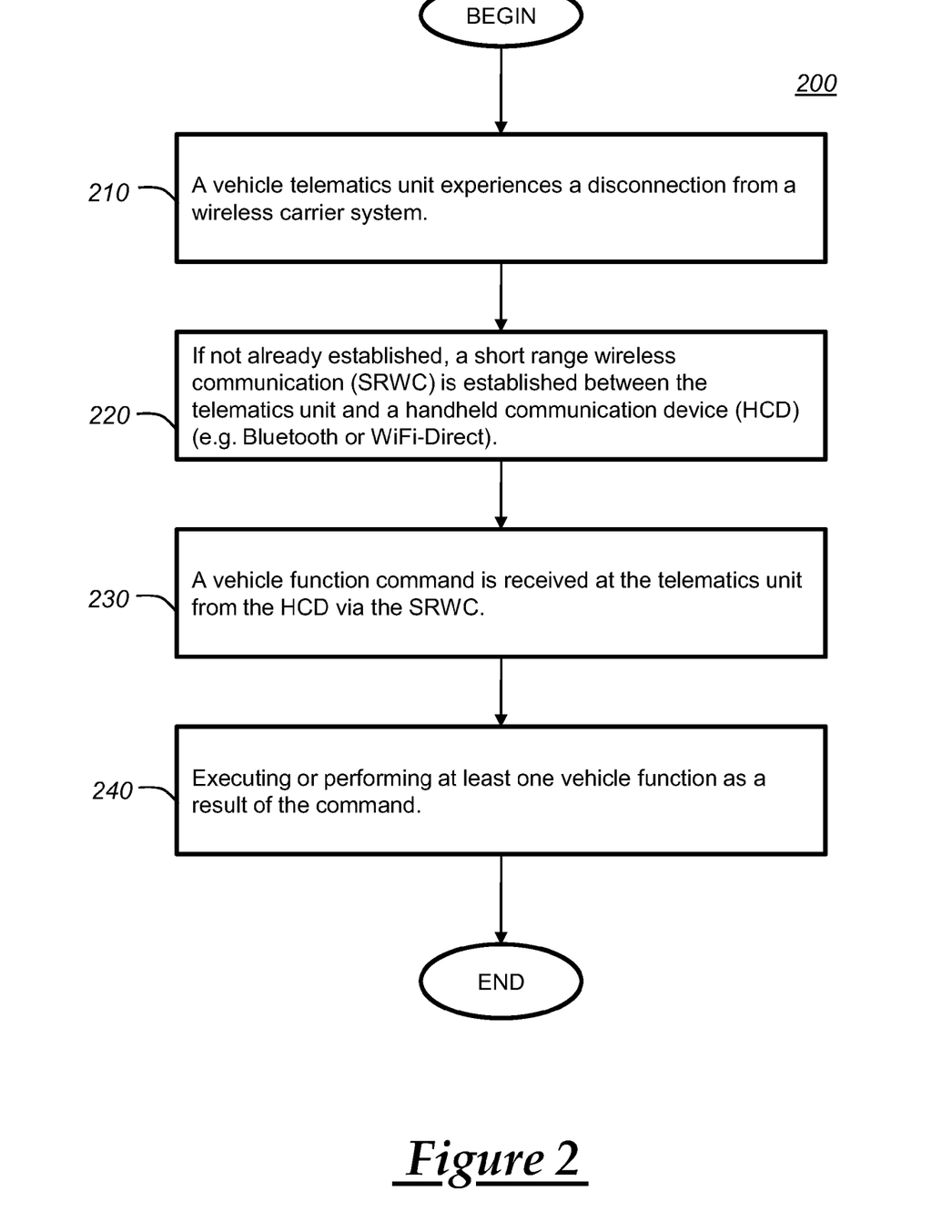
FIG. 2 is a flowchart depicting one exemplary embodiment of the present disclosure.

Turning now to FIG. 2, there is shown a method 200 of performing a vehicle function using the HCD which has been paired to the telematics unit 30. In some circumstances, the user may command (or instruct) the vehicle via the HCD to perform a vehicle function; for example, when the telematics unit and/or the HCD are connected to the wireless carrier system 14, the command may be sent from the HCD to the call center 20 and then from the call center to the telematics unit 30. As used herein, a connection to the wireless carrier system includes a wireless coupling to a cell tower 70 and/or any other suitable access point of the wireless carrier system (e.g., in CDMA networks, this may include the ability to obtain a pilot channel, a synchronization channel, an access channel, a paging channel, a traffic channel, etc.). Herein, a connection may also be referred to as an established connection, a connection event, etc. (according to the context). And as used herein, disconnection from the wireless carrier system should be broadly construed and includes any interruption in the ability to communicate (e.g., place, receive, maintain, etc. voice or data calls) within the wireless carrier system 14, the land network 16, the call center 20, etc. The wireless carrier system disconnection may be caused by any environmental interference (e.g., solar radiation), any geographical interference (e.g., cellular shielding by natural and/or artificial structures and/or objects—such as parking garages, basements, etc.), any internet connection failure (e.g., voice over internet protocol or VoIP), any local area network (LAN) connection or port failures, any malfunctions, corruptions, or viral attacks on a network or associated hardware (including the call center computers, the vehicle's telematics unit, etc.), excessive network traffic and/or latency issues, etc., just to name a few instances. Skilled artisans will appreciate other potential causes. Herein, a disconnection may also be referred to as a 'connectivity lapse' or a 'communication disconnection' or a 'communication failure' or a 'disconnection event'.

In FIG. 2, the method begins at step 210 where the vehicle becomes disconnected from the wireless carrier system 14 (and therefore is unable to connect with the call center 20), and the telematics unit 30 identifies this disconnection event. And at step 220, the HCD 96 may connect with the telematics unit 30 using short range wireless communication (e.g., Bluetooth or WiFi-Direct). This connection may occur before or after the failure is identified. In one embodiment, the telematics unit 30 enters into a LISTENING MODE automatically after identifying the wireless network disconnection. At step 230, the HCD may send a command which is received by the telematics unit 30 via the SRWC to perform one or more vehicle functions. Vehicle functions may include, but are not limited to, operation or actuation of: the vehicle's power door locks, the vehicle's horn, and the vehicle's ignition or engine-start up. At step 240, the vehicle 12 may perform the function (e.g., the telematics unit may command one or more VSMs 42). It will be appreciated that at any time after the wireless network disconnection, connectivity between the call center and the telematics unit 30 may be reestablished (i.e., a reconnection). If this occurs, commands from the HCD may be sent to (or routed via) the call center and the wireless carrier system 14. Any reconnection may be facilitated by the telematics unit 30 operating in CONNECT OR RECONNECT MODE as will be appreciated by skilled artisans—i.e., attempting to reconnect with the wireless carrier system 14. The telematics unit may operate in the RECONNECT MODE during or generally during any operations or communications over SRWC. Thus, the telematics unit may listen for opportunities to RECONNECT with the wireless carrier system 14 when system becomes available (e.g., in CDMA networks, it may listen for an opportunity to acquire a pilot channel). Availability may include situations where the issue(s) and/or obstactle(s) causing the disconnection have been removed and/or resolved.

It should be appreciated that when the telematics unit 30 is in the LISTENING or RECONNECT MODES, the transceiver 55 may only be actively ON for brief, periodic intervals of time in order to conserve battery power and contribute to the maintenance of the vehicle's electrical power budget.

Figure 3:
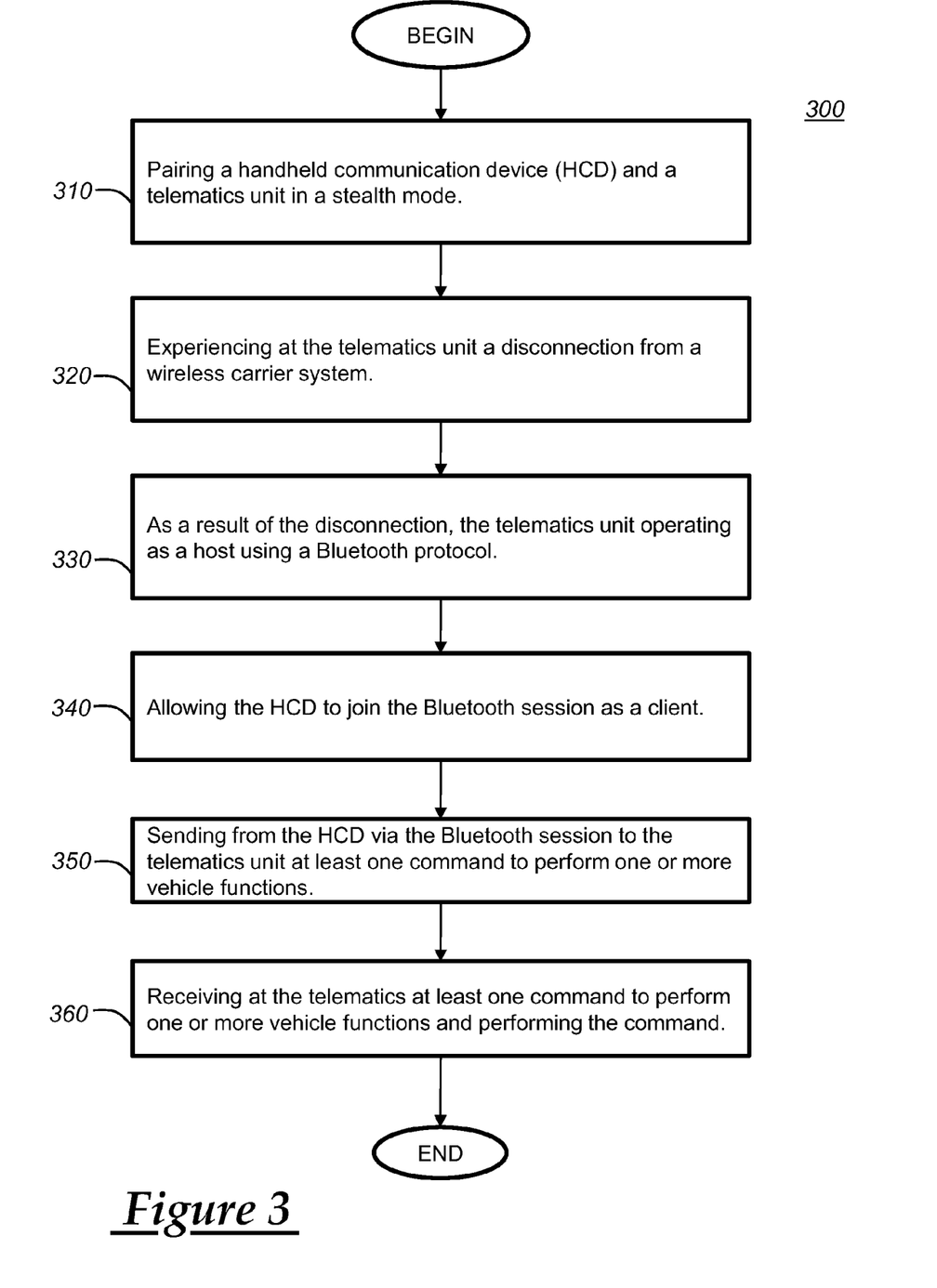
FIG. 3 is a flowchart depicting another exemplary embodiment of the present disclosure.

Turning now to FIG. 3, there is shown a method 300 of performing a vehicle function using a command (or instruction) sent from the HCD over a Bluetooth protocol. The method begins at step 310 where the devices, the HCD 96 and the telematics unit 30, are paired and bonded in a STEALTH MODE using the special ID (e.g., initiated by the call center 20). At step 320, the vehicle becomes disconnected from the wireless carrier system 14 and/or its associated telephony; e.g., for any of the aforementioned reasons. As a result of the disconnection, at step 330 the telematics unit 30 operates as a host, establishing a Bluetooth protocol (e.g., a Bluetooth network). And at step 340, the HCD 96 joins the Bluetooth session as a client. The HCD may then send one or more commands using the Bluetooth protocol to the vehicle 12 via the telematics unit to perform one or more vehicle functions [step 350]. At step 360, the vehicle 12 may receive the command at the telematics unit using the Bluetooth protocol and then may perform the function or execute the command (e.g., the telematics unit may command one or more VSMs 42). Thereafter, the method may end.

Figure 4:
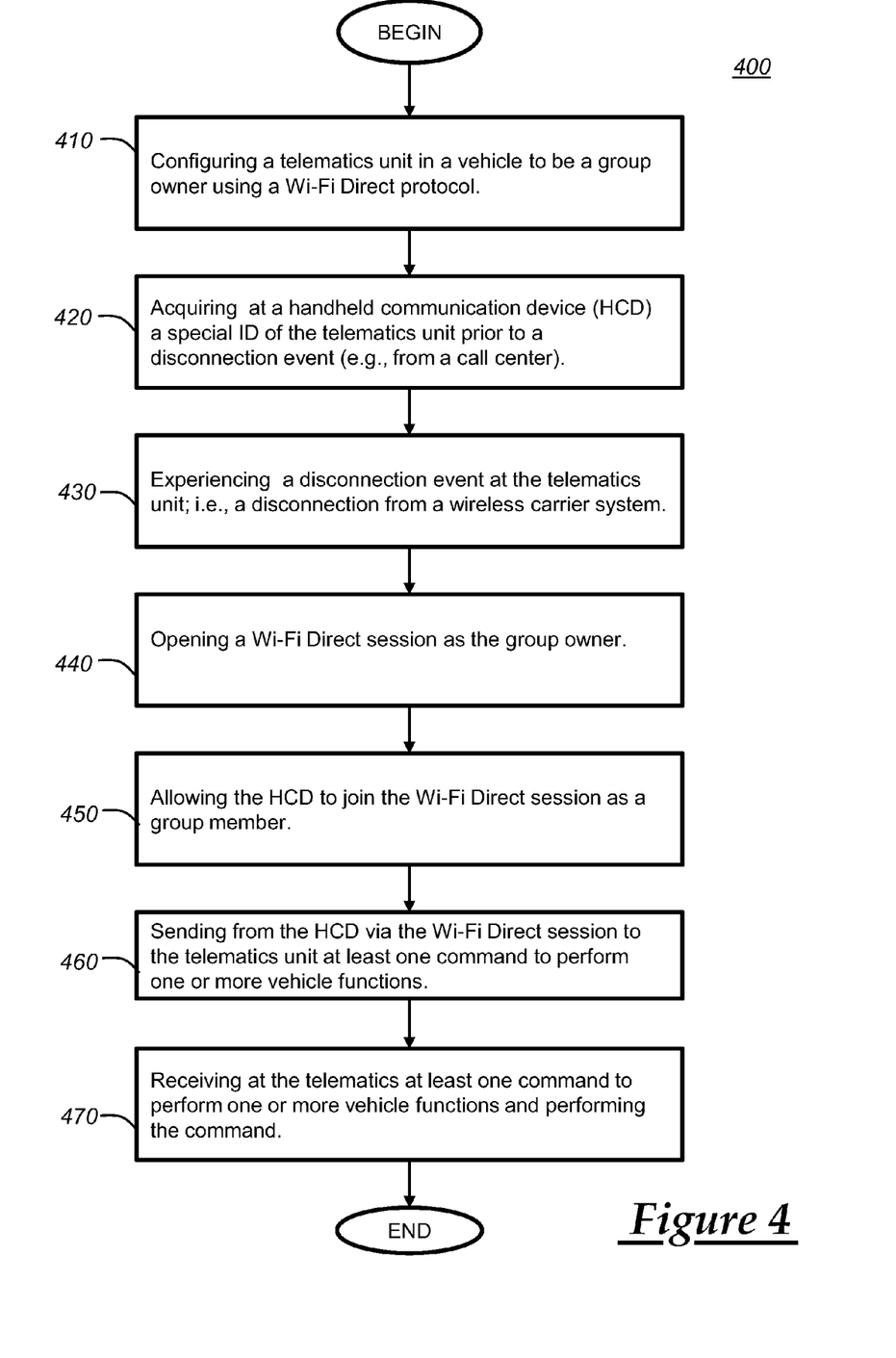
FIG. 4 is a flowchart depicting another exemplary embodiment of the present disclosure.

Turning now to FIG. 4, there is shown a method 400 of performing a vehicle function using a command (or instruction) sent from the HCD over a Wi-Fi Direct protocol. The method begins at step 410 where the telematics unit 30 is configured to be the group owner. The configuration, for example, may occur at a vehicle service center or by the manufacturer of the telematics unit. At step 420, the HCD 96 acquires from the call center 20 the special ID of the telematics unit 30, e.g., prior to a disconnection event. At step 430, the vehicle becomes disconnected from the wireless carrier system 14 and/or its associated telephony; e.g., for any of the aforementioned reasons. As a result of the disconnection, at step 440 the telematics unit 30 operates as the host or group owner according to the Wi-Fi Direct protocol (opening a group session). At step 450, the HCD may join the group session as a satellite device. The HCD may then send a command using the Wi-Fi Direct protocol to the vehicle 12 via the telematics unit to perform one or more vehicle functions [step 460]. And at step 470, the vehicle may receive the command at the telematics unit using the WiFi-Direct protocol and then may perform the function or execute the command (e.g., the telematics unit may command one or more VSMs 42). Thereafter, the method may end.

The embodiments above are provided by way of example and not by way of limitation. Other embodiments may exist. For example, the HCD 96 may be the master or the host while the telematics unit 30 may be the slave or the client. This master/slave arrangement may be applicable to any short range wireless communication including Bluetooth and Wi-Fi Direct protocols. In addition, the Bluetooth and Wi-Fi Direct protocol implementations were only exemplary; other protocols may be used.

In order to establish short range wireless communication between the HCD and the telematics unit 30, either or both devices may have and utilize general or specific applications or computer or software program(s) enabling such communication. One example of a commercially available embodiment of a mobile device software application is Onstar's RemoteLink™.

Thus, the method described above or parts thereof may be implemented using a computer program product may include instructions carried on a computer readable medium for use by one or more processors of one or more computers (e.g., within the HCD or telematics unit) to implement one or more of the method steps. The computer program product may include one or more software programs (or applications) comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing short range wireless communication (SRWC) between a handheld communications device (HCD) and a vehicle telematics unit, comprising the steps of:
   receiving a special identifier (ID) at the HCD from a vehicle call center or a vehicle service center associated with the vehicle telematics unit (VTU), wherein the call center is configured to provide one or more backend functions to the VTU;
   using the special ID, wirelessly linking the VTU and the HCD to one another according to at least one SRWC protocol; then,
   determining at the VTU the occurrence of a cellular disconnection event; then,
   automatically conducting communication between the telematics unit and the HCD according to the at least one SRWC protocol as a result of the disconnection event;
   receiving from the HCD at the VTU via the established SRWC a command to perform at least one vehicle function; and
   when, following the automatic establishing SRWC step the VTU determines that the cellular disconnection event has ceased, then automatically:
      ceasing conducting communication via the at least one SRWC protocol; and
      receiving any additional commands to perform vehicle functions via cellular communication.

2. The method of claim 1 wherein the special identifier (ID) is randomly generated at the call center or the service center.

3. The method of claim 2, wherein the randomly generated special ID is generated at the at the call center or the service center.

4. The method of claim 1, wherein the at least one SRWC protocol includes a Bluetooth protocol, a Wi-Fi Direct protocol, or a Wi-Fi protocol, wherein in the Wi-Fi protocol, the VTU is serves as a Wi-Fi access point (WAP) to the HCD operating as a client device.

5. The method of claim 1, wherein the cellular disconnection event is caused by one or more of the following: an environmental interference; an geographical interference; an internet connection failure; a connection or port failure; a malfunction, corruption, or viral attack on an associated cellular network or cellular network hardware; or excessive network traffic or latency issues.

6. The method of claim 1, wherein the step of receiving from the HCD at the VTU via the established SRWC the command to perform the at least one vehicle function includes: receiving at the HCD data from the vehicle call center that authorizes the VTU to perform the at least one vehicle function.

* * * * *